United States Patent [19]
Itoh et al.

[11] Patent Number: 5,631,888
[45] Date of Patent: May 20, 1997

[54] MASTER DISC RECORDING APPARATUS AND METHOD FOR RECORDING DATA ON DIFFERENT TYPES OF MASTER DISCS

[75] Inventors: Naoto Itoh; Minemasa Ohta, both of Yamanashi-ken, Japan

[73] Assignee: Pioneer Electronic Corporation, Japan

[21] Appl. No.: 627,003

[22] Filed: Apr. 3, 1996

[30] Foreign Application Priority Data

Apr. 4, 1995 [JP] Japan .................. 7-078887

[51] Int. Cl.⁶ .................................................. G11B 7/00
[52] U.S. Cl. .................................. 369/60; 369/84
[58] Field of Search ........................ 369/32, 59, 47, 369/60, 84, 54, 58

[56] References Cited

U.S. PATENT DOCUMENTS

| | | | |
|---|---|---|---|
| 4,060,831 | 11/1977 | Halter | 369/84 |
| 4,536,864 | 8/1985 | Van Rosmalen | 369/60 |
| 5,371,551 | 12/1994 | Logan et al. | 369/60 |
| 5,455,815 | 10/1995 | Ishida et al. | 369/47 |
| 5,457,667 | 10/1995 | Kojima et al. | 369/47 |
| 5,471,450 | 11/1995 | Yonemitsu et al. | 369/50 |
| 5,502,600 | 3/1996 | Bernardini | 369/84 |
| 5,526,333 | 6/1996 | Usui et al. | 369/50 |

*Primary Examiner*—Nabil Hindi
*Attorney, Agent, or Firm*—Finnegan, Henderson, Farabow, Garrett & Dunner, L.L.P.

[57] ABSTRACT

A data block of digital data, which is to divided into a plurality of data blocks, is input to a transfer rate changing apparatus from a data transferring device at a first transfer rate each time when a transfer instruction signal is supplied to the data transferring device. The transfer rate changing apparatus is provided with: a memory device for storing the data block at the first transfer rate, which is transferred from the data transferring device, and outputting the stored data block at a second transfer rate, which is different from the first transfer rate; and a controlling device for supplying the transfer instruction signal, which instructs the data transferring device to transfer one data block to the memory device, to the data transferring device when the memory device finishes outputting another data block which has been transferred from the data transferring device prior to the one data block.

14 Claims, 4 Drawing Sheets

MASTER DISC RECORDING APPARATUS AND METHOD FOR RECORDING DATA ON DIFFERENT TYPES OF MASTER DISCS

BACKGROUND OF THE INVENTION

1. Field of the Invention

The present invention generally relates to an apparatus for recording a master disc such as a LBR (Laser Beam Recorder), which is used for forming optical discs for sale as replica discs by copying the master disc in a factory. The present invention also relates to a device for changing the transfer rate of the data to be recorded on the master disc, which is used in such a master disc recording apparatus.

2. Description of the Related Art

A factory for manufacturing such optical discs is required to adapt various types of optical discs such as CD, CD-ROM, LD, DVD, HVD and so on. In the factory, a master disc is recorded or formed before it is copied to form optical discs. The master disc has the physical shape same as the copied optical disc and is recorded with the same information as the copied optical disc. Accordingly, the master disc is recorded or formed for each type of the optical disc as the object for copying.

As one type of optical disc, the CD (Compact Disc) is recorded mainly with audio data. As another type, the CD-ROM (CD-Read Only Memory) is recorded with a large volume of data for computers. As another type, the LD (Laser Disc) is recorded with video data as well as the audio data. As another type, the DVD (Digital Versatile Disc) is recorded with various control data in addition to the video and audio data to allow various presentation of the video and audio data. As another type, the HVD (High Vision disc) is recorded with high vision data.

In those various types of optical discs, the standard record density is different from type to type. Thus, the density of the record track in the radial direction of the disc (i.e. track density) is also different from type to type. For example, the DVD, which is based on the video data compressing and encoding technique, has the same radius of recordable area as the CD, but has the recordable time of 135 minutes, which is about twice that of the CD (which has the recordable time of 74 minutes). Thus, in the case of recording the master disc for the DVD, it takes about double the recording time for the master disc recording apparatus to move the optical pickup and record the information over the same radius, in comparison with the master disc for the CD. That is to say, the record time required for the optical pickup of the master disc recording apparatus to move each radial distance on the DVD as the master disc is about half of that of the CD as the master disc.

Therefore, in factories of manufacturing optical discs, each time the type of optical disc to be manufactured is changed, the moving distance per each unit time in the radial direction of the optical pickup of the master disc recording apparatus is also changed or re-adjusted in accordance with the new type. Further, in order to omit the re-adjustment of the moving distance per each unit time, each factory is provided with a plurality of master disc recording apparatuses which have moving distance per each unit time in the radial direction of the optical pickups that are different from each other to deal with the various types of the optical discs.

In this manner, the linear speed for recording (which is proportional to the rotation number of the master disc) and the moving distance per each unit time in the radial direction of the optical pickup in the master disc recording apparatus are different from disc type to disc type. Thus, it becomes necessary to re-adjust the moving distance per each unit time in the radial direction of the optical pickup when the type of master disc is changed.

However, since the master disc is used as the origin for manufacturing a large number of optical discs for sale, the recording and forming operation of the master disc requires high accuracy. In order to obtain and keep such high accuracy, the adjustment of the moving distance per each unit time in the radial direction of the optical pickup is a rather difficult and time consuming operation.

Consequently, each time the type of optical disc is changed, the difficult and time consuming adjustment of the master disc recording apparatus is performed in accordance with the new type of optical disc to be manufactured. Especially, when the moving distance per each unit time speed in the radial direction is to be changed in large degrees, the re-adjustment may not be possible.

Further, since high accuracy is required of the master disc recording apparatus as explained above, each master disc recording apparatus is rather expensive. Accordingly, if the number of master disc recording apparatuses in one factory is increased as the number of types of optical discs is increased so as not to perform such a re-adjustment, it is not economically sound or quick in adapting the new type of optical disc.

SUMMARY OF THE INVENTION

It is therefore an object of the present invention to provide a master disc recording apparatus, which does not require re-adjustment even if the type of master disc to be recorded is changed, and a transfer rate changing apparatus suitable for the same.

The above object of the present invention can be achieved by a transfer rate changing apparatus, to which a data block of digital data, which are divided into a plurality of data blocks, is inputted from a data transferring device by a first transfer rate each time when a transfer instruction signal is supplied to the data transferring device. The transfer rate changing apparatus is provided with: a memory device for storing the data block by the first transfer rate, which is transferred from the data transferring device, and outputting the stored data block by a second transfer rate, which is different from the first transfer rate; and a controlling device for supplying the transfer instruction signal, which instructs the data transferring device to transfer one data block to the memory device, to the data transferring device when the memory device finishes outputting another data block which has been transferred from the data transferring device prior to the one data block.

According to the transfer rate changing apparatus of the present invention, the digital data (e.g. video data compressed and encoded by MPEG) are divided into data blocks, each of which may have digital data of predetermined data volume (e.g. 2.5M bytes). When the memory device finishes outputting another data block which has been transferred from the data transferring device prior to one data block, the transfer instruction signal is supplied to the data transferring device from the controlling device, so that one data block is transferred from the data transferring device to the memory device according to the transfer instruction signal. In those successive operations, the data block is transferred from the data transferring device (e.g. a WORM type optical disc reader) and is stored into the memory device (e.g. a RAW having a large memory capacity) at a first transfer rate (e.g. 20M BPS) while the stored data block is outputted from the memory device at a second transfer rate (e.g. 5M BPS). Accordingly, the digital data are transferred in the form of data blocks which are intermittently or continuously transferred from the data transferring device, and are outputted in the form of data blocks which are continuously outputted from the memory device. Namely, the change of the transfer rate is performed by the transfer rate changing apparatus of the present invention.

In the above described present invention, if the first transfer rate is higher than the second transfer rate, the data transferring device intermittently transfers the data block so to perform the change of the transfer rate. However, even if the first transfer rate is lower than the second transfer rate, the change of transfer rate is still possible. Namely, in the latter case, the controlling device supplies the transfer instruction signal such that the data transferring device transfers the data block continuously (i.e. without any time interval between two successive data blocks). Then, after the data blocks are accumulated in the memory device, the memory device outputs the stored data blocks continuously by the second transfer rate.

In the above described construction of the present invention, a data transferring device may be the WORM type optical disc reader, but may be any kind of data transferring device as long as it can be controlled by the controlling device to perform the above described operation.

Further, a memory device may be the RAM having a large memory capacity, but may be any kind of memory device as long as it can store a large volume of digital data by a relatively high transfer rate such as a hard disc device. The present invention still functions well as long as the digital data can be controlled in the form of a plurality of data blocks by the controlling device even if the memory capacity of the memory device is rather small.

In one aspect of the transfer rate changing apparatus of the present invention, the memory device comprises a plurality of memories (e.g. a group of RAMs) each for storing the transferred data block by the first transfer rate and outputting the stored data block by the second transfer rate, and that the controlling device selects one of the memories on the basis of a data volume of the data block and the first transfer rate, as a memory to store the transferred data block by the first transfer rate, and further selects another of the memories on the basis of the data volume of the data block and the second transfer rate as a memory to output the stored data block by the second transfer rate.

In this aspect, one of the memories is selected by the controlling device on the basis of the data volume of the data block and the first transfer rate. Then, the transferred data block is stored into the selected one of the memories by the first transfer rate. Another of the memories is selected by the controlling device on the basis of the data volume of the data block and the second transfer rate. Then, the stored data block is outputted from the selected another of the memories by the second transfer rate. The selection may be performed such that two memories are alternatively selected. The selection may be performed per each data block such that each data block be stored in one of the memories. Alternatively, the selection may be performed in the middle of transferring one data block such that the digital data in one data block is stored separately into two memories. In any event, the digital data are output in the form of data blocks which are continuously output from the memories. Namely, the change of transfer rate can be performed by use of a plurality of memories which can easily accomplish a large memory capacity.

In the above described one aspect, the apparatus may be further provided with: a writing selector switch for switching to selectively connect the selected one of the memories with the data transferring device; and a reading selector switch for switching to selectively connect the selected another of the memories with an output of the apparatus.

In this aspect, on one hand, the selected one of the memories is connected by the writing selector switch with the data transferring device. On the other hand, the selected another of the memories is connected by the reading selector switch with an output of the apparatus. In this construction, the switching of the selector switches may be performed per each block data. Alternatively, the switching of the selector switches may be promptly performed in the middle of the data block in accordance with the memory capacity of each memories.

In the above described one aspect, each of the memories may be a buffer memory having writing and reading clocks different in frequency from each other. Thus, the writing and reading operations can be separately performed on the basis of the writing and reading clocks respectively.

In another aspect of the transfer rate changing apparatus the present invention, the controlling device supplies a writing clock corresponding to the first transfer rate and a reading clock corresponding to the second transfer rate, to the memory device. Thus, on the basis of the writing clock, the storing operation can be reliably performed at by the first transfer rate, while the outputting operation can be reliably performed at the second transfer rate.

The above object of the present invention can be also achieved by a master disc recording apparatus provided with: a data transferring device for transferring a data block of digital data, which are divided into a plurality of data blocks, at a first transfer rate each time when a transfer instruction signal is supplied thereto; a memory device for storing the data block at the first transfer rate, which is transferred from the data transferring device, and outputting the stored data block at a second transfer rate, which is different from the first transfer rate; a controlling device for supplying the transfer instruction signal, which instructs the data transferring device to transfer one data block to the memory device, to the data transferring device when the memory device finishes outputting another data block which has been transferred from the data transferring device prior to the one data block; and a recording device for recording the data block outputted from the memory device onto a data track of a master disc by the second transfer rate such that a recording point where the data block is recorded on the data track is moved in a radial direction of the master disc by a moving distance per each unit time which is constant regardless of the type of master disc.

According to the transfer rate changing apparatus of the present invention, the digital data (e.g. video data compressed and encoded by MPEG) are divided into the data blocks, each of which may have digital data of predetermined data volume (e.g. 2.8M bytes). When the memory device finishes outputting another data block which has been transferred from the data transferring device prior to one data block, the transfer instruction signal is supplied to the data transferring device from the controlling device, so that one data block is transferred from the data transferring device to the memory device according to the transfer instruction signal. In those successive operations, the data block is transferred from the data transferring device (e.g. a WORM type optical disc reader) and stored into the memory device (e.g. a RAM having a large memory capacity) at the first transfer rate (e.g. 20M BPS) while the stored data block is outputted from the memory device at the second transfer rate (e.g. 5M BPS). Accordingly, the digital data are outputted in the form of data blocks which are continuously outputted from the memory device. Then, the data block outputted from the memory device is recorded by the recording device onto the data track of the master disc at the second transfer rate. The recording point (e.g. a laser beam spot formed on the master disc) is moved in the radial direction of the master disc. At this time of recording, the moving distance per each unit time is constant regardless of the type of the master disc (e.g. the CD, the CD-ROM, the DVD, the HVD). For example, the movement for the radial range of 25 mm to 58 mm on the master disc is performed in 74 minutes regardless of the type of the master disc. Accordingly, once the moving distance per each unit time of the recording point is set to the recording device, it is not necessary to change it in the moving distance per each unit time, so that the re-adjustment of the recording device is not necessary when the type of the master disc to be recorded is changed.

In one aspect of the master disc recording apparatus of the present invention, the data transferring device intermittently reproduces a record medium, on which the digital data are recorded, to generate the data block one after another. Thus, the data block can be easily generated one after another by the data transferring device.

In another aspect of the master disc recording apparatus of the present invention, the recording device records the data block onto the data track such that a linear velocity of the recording point along the data track is increased relative to the linear velocity corresponding to a standard transfer rate of the master disc by an amount based on a ratio of the standard transfer rate and the second transfer rate if the standard transfer rate is lower than the second transfer rate.

In this aspect of the present invention, if the standard transfer rate is lower than the second transfer rate, the linear velocity of the recording point along the data track is increased by the amount based on the ratio of the standard transfer rate and the second transfer rate. Thus, the recording density per each unit length obtained by the recording device can be substantially equal to the recording density corresponding to the standard transfer rate.

In another aspect of the master disc recording apparatus of the present invention, the recording device records the data block onto the data track such that a linear velocity of the recording point along the data track is reduced relative to the linear velocity corresponding to a standard transfer rate of the master disc by an amount based on a ratio of the standard transfer rate and the second transfer rate if the standard transfer rate is higher than the second transfer rate.

In this aspect of the present invention, if the standard transfer rate is higher than the second transfer rate, the linear velocity of the recording point along the data track is decreased by the amount based on the ratio of the standard transfer rate and the second transfer rate. Thus, the recording density per each unit length obtained by the recording device can be substantially equal to the recording density corresponding to the standard transfer rate.

In another aspect of the master disc recording apparatus of the present invention, the memory device comprises a plurality of memories each for storing the transferred data block by the first transfer rate and outputting the stored data block by the second transfer rate, and that the controlling device selects one of the memories on the basis of a data volume of the data block and the first transfer rate, as a memory to store the transferred data block at the first transfer rate, and further selects another of the memories on the basis of the data volume of the data block and the second transfer rate as a memory to output the stored data block at the second transfer rate.

In this aspect, the digital data are outputted in the form of data blocks which are continuously outputted from the memories. Thus, the re-adjustment of the recording device is not necessary when the type of master disc to be recorded is changed.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

(I) First Embodiment

Figure 1:
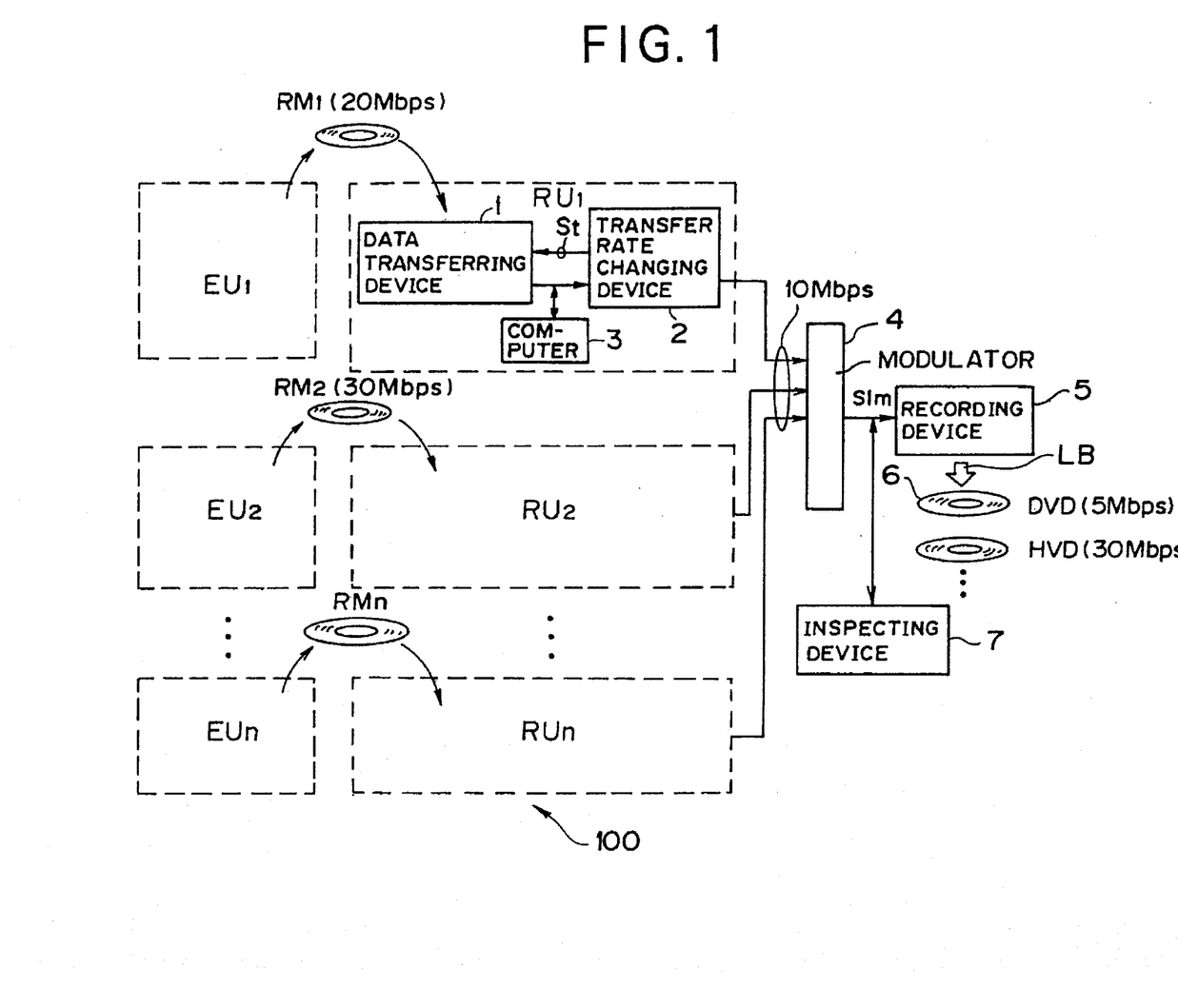
FIG. 1 is a block diagram of a master disc recording apparatus as a first embodiment of the present invention.

A master disc recording apparatus as a first embodiment of the present invention is shown in FIG. 1.

In FIG. 1, a master disc recording apparatus 100 is provided with: editing units EU1 to EUn for integrating (storing) the information from a plurality of record media such as a VTR (Video Tape Recorder) to intermediate record media RM1 to RMn respectively; reproducing units RU1 to RUn for reproducing the information integrated (stored) in the editing units EU1 to EUn respectively; a modulator 4 for outputting a laser modulation signal S1m in accordance with the digital data reproduced by the reproducing unit RUi (i=1, 2, ..., n); a recording device 5 having an optical pickup including a laser unit, for recording the reproduced information by irradiating a master disc 6 with a modulated laser beam LB from the laser unit, which is modulated by the laser modulation signal S1m outputted from the modulator 4; and an inspecting device 7 for inspecting the quality of the digital data after the modulator 4 i.e. the laser modulation signal S1m. The master disc 6 is used for electrically molding a stamper to copy and produce optical discs (e.g. DVDs, HVDs) for sale.

Each of the editing units EU1 to EUn is provided with: a VTR for reproducing the video signal of the cinema video image which has been taken by a telecine camera etc.; an encoder for encoding and compressing the output of the VTR by high efficiency (e.g. by the MPEG1 or MPEG2 standard); and an adding device for adding an audio signal, a character information signal, etc. to the video signal. Each of the editing unit EU1 to EUn performs formatting of the intermediate record media RM1 to RMn respectively in correspondence with the type of the master disc 6 (i.e. the type of the copied optical discs for sale) and records the information on the formatted intermediate record media RM1 to RMn. Here, it is to be noted that the information recorded on the intermediate record media RM1 to RMn is the same as that to be recorded on the master disc 6.

The intermediate record medium RMi (i=1, 2, ..., n) may be an optical disc of WORM (Write Once Read Many) type, an optical disc of re-writable type such as a MO (Magneto Optical) disc, etc. The reason why the information is once integrated (stored) to the intermediate record medium RMi is to unite the information supplied via different routes on the intermediate record medium RMi and to perform the quality check of the united information on the intermediate record medium. The intermediate record medium RMi is reproduced by a maximum transferring rate of 20 to 30M BPS (Mega Bit Per Second), for example.

Each of the reproduction units RU1 to RUn reproduces the intermediate record media RM1 to RMn respectively, and outputs the reproduced digital data according to a predetermined transferring rate (e.g. 20M BPS).

The modulator 4 outputs the laser modulation signal S1m for modulating the laser beam LB in accordance with the digital data supplied from the reproducing unit RUi.

The recording device 5 has an optical pickup including a laser unit for emitting a laser beam LB such as an Argon laser beam in correspondence with the digital data reproduced by the reproducing unit RUi, i.e., the laser beam LB modulated by the laser modulation signal S1m. The recording device 5 performs cutting (light exposing) of the glass original disc i.e. the master disc pre-form which is composed of glass material, by real time by use of the laser beam LB which is modulated by the modulator 4. The optical pickup of the recording device 5 is adjusted to proceed in a radial direction of the disc by a constant moving distance per each unit time in the radial direction (i.e. the moving speed in the radial direction at each radial position), regardless of the type of disc used as the recording object. For example, the adjustment of various constants in the servo circuit for driving the optical pickup of the record device 5 is performed such that the optical pickup be moved on the disc for the record radius of 25 mm to 58 mm in 74 minutes with respect to, as the standard, the moving distance per each unit time in the standard reproduction of the CD.

The master disc 6 consists of a glass original disc made of glass material. The external shape of the glass original disc is shaped in accordance with the type of optical disc as the copy object (such as a DVD, HVD, CD, etc.). The glass original disc is finely surface-polished, is washed by the ultra sound wave, and is coated with (photo-resist) the photo-sensitive agent.

The recording device 5 rotates the master disc 6 while irradiating the photo-resist coated on the master disc 6 with the laser beam LB which is modulated by the modulator 4. By this, the light exposed portion (i.e. the pit) is formed on the glass original disc to be the master disc 6.

The inspecting device 7 inspects the quality of the digital data after modulation by the modulator 4.

In FIG. 1, each of the reproducing units RU1 to RUn is provided with: a data transferring device 1; a transfer rate changing device 2; and a personal computer 3.

The data transferring device 1 reproduces the intermediate record medium RMi by a predetermined transfer rate (e.g. 20M BPS). At the time of reproducing, the data transferring device 1 reproduces the intermediate record medium RMi intermittently on the basis of a transfer instruction signal St, which is supplied from the transfer rate changing device 2. This intermittent reproduction forms "block data" one after another, which is the reproduced digital data in each block prescribed by the intermittent reproduction.

The transfer rate changing device 2 changes the transfer rate (20M BPS) of the digital data, which is transferred from the data transferring device 1, to a different transfer rate (10 M BPS), and outputs the data by this different transfer rate (10 M BPS).

The personal computer 3 controls the overall operation of each of the reproducing units RU1 to RUn.

In FIG. 1, the master disc recording apparatus 100 simplifies the adjustment of the servo control in the recording device 5, by employing a plurality of editing units EU1 to EUn, each of which is exclusive for one type of the record medium, and a plurality of reproducing units RU1 to RUn, each of which is also exclusive for one type of the record medium, respectively. However, the master disc recording apparatus 100 can function by employing just one set of the editing unit and the reproducing unit while adjusting the recording device 5 in accordance with the type of record medium.

Figure 2:
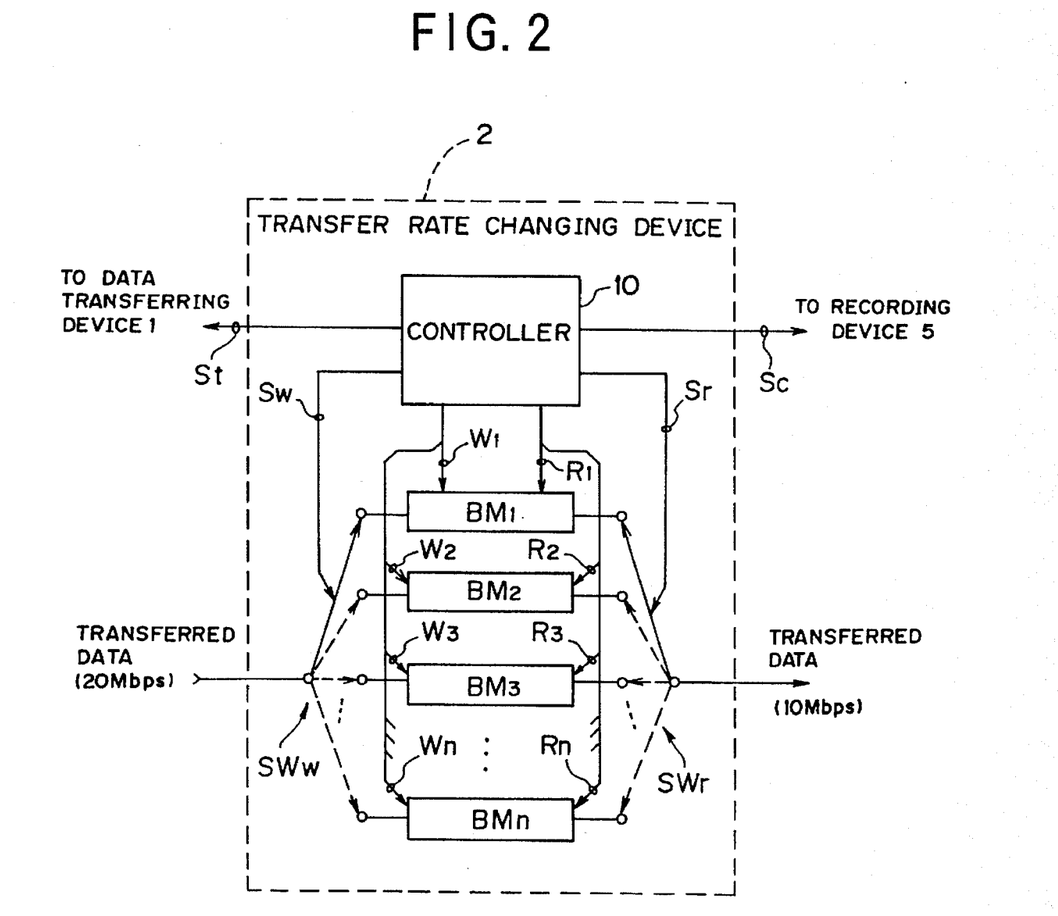
FIG. 2 is a block diagram of a transfer rate changing device in the master disc recording apparatus of FIG. 1.

FIG. 2 shows a construction of the transfer rate changing device 2.

In FIG. 2, the transfer rate changing device 2 is provided with: a controller 10, buffer memories BM1 to BMn, a writing switch SWw and a reading switch SWr.

Each of the buffer memories BM1 to BMn may be a RAM (Random Access Memory) for storing data of a predetermined volume (e.g. 2.5M bytes). The memory capacity of each of the buffer memories BM1 to BMn may be enough to store one block data (i.e. the reproduced digital data in each block) transferred from the data transferring device 1, for example. However, since the memory, such as a RAM is speedy in writing and reading the data, this memory capacity of each of the buffer memories BM1 to BMn may be any value while the buffer memories BM1 to BMn are switched over regardless of transferring the digital data by the block unit. This is because it is enough to store the transferred digital data without overflowing it.

Each of the buffer memories BM1 to BMn is a memory which can perform the writing operation and the reading operation by different clocks and by different frequencies (i.e. different transfer rates) from each other, such as a dual port memory.

The writing switch SWw selects one buffer memory BMi among the buffer memories BM1 to BMn on the basis of a writing selection signal Sw, and supplies the transferred digital data to the selected buffer memory BMi. The reading switch SWr selects one buffer memory BMj (which may be coincident or not coincident with the buffer memory BMi) among the buffer memories BMi to BMn on the basis of a reading selection signal Sr, and supplies the stored digital data from the selected buffer memory BMj.

The controller 10 supplies the writing selection signal Sw to the writing switch SWw to select one buffer memory BMi. The controller 10 also supplies writing clocks W1 to Wn each having the same frequency as that of the transfer rate of the block data (e.g. 20M BPS) transferred from the data transferring device 1 to each of the buffer memories BM1 to BMn. The controller 10 further supplies the reading clocks R1 to Rn each having the same frequency as the recording frequency of the recording device 5. When transferring the digital data to the buffer memory BMi is completed, the controller 10 supplies the transfer instruction signal St to the data transferring device 1, and also supplies a control signal Sc to indicate the start of the transferring of the digital data from the buffer memory BMi to the recording device 5.

Figure 3:
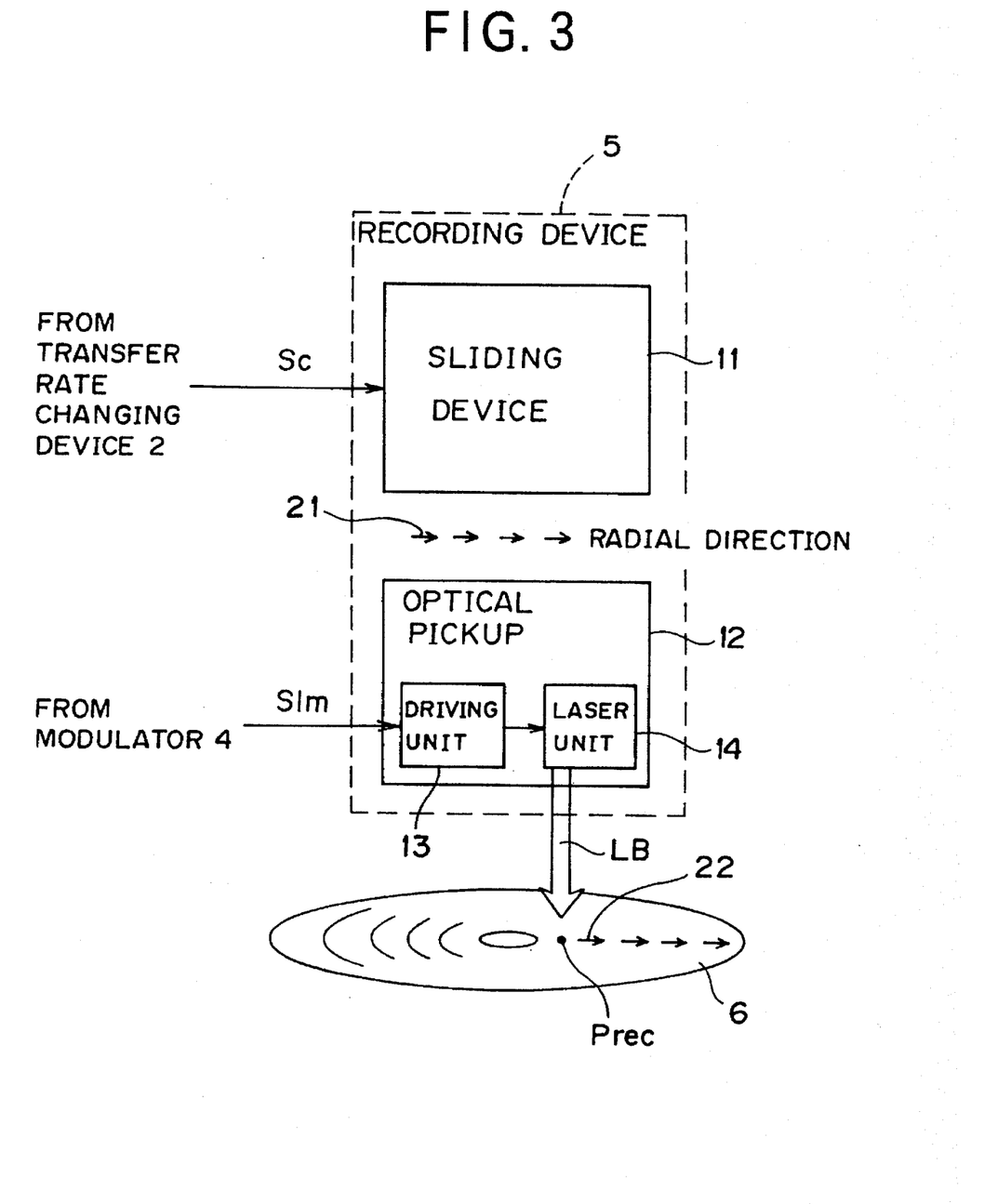
FIG. 3 is a block diagram of a recording device in the master disc recording apparatus of FIG. 1.

FIG. 3 shows a construction of the recording device 5.

In FIG. 3, the recording device 5 is provided with a sliding device 11 and an optical pickup 12. The sliding device 11 is constructed to move the optical pickup 12 in the radial direction of the master disc 6 as indicated by arrows 21 in the figure according to the control signal Sc, which is supplied from the transfer rate changing device 2. The optical pickup 12 is provided with a driving unit 13 and a laser unit 14. The driving unit 13 is constructed to drive the laser unit 14 by supplying a laser driving power thereto, which is modulated in accordance with the laser modulation signal S1m supplied from the modulator 4. The laser unit 14 emits the laser beam LB modulated according the laser modulation signal S1m. Accordingly, a recording point Prec at which the laser beam LB is focused on a record track of the master disc 6 is moved in the radial direction of the master disc 6 in accordance with the sliding motion of the sliding device 11 as indicated by arrows 22 in the figure.

Next, the recording operation of the master disc recording apparatus 100 will be explained.

In the present embodiment, the digital data is supplied to the master disc 6, which is the origin of copying a DVD (which has a standard average data rate of 5M BPS), by the data rate of 10 M BPS (i.e. by the double data rate of the standard average data rate) so as to perform a high speed recording operation.

When the personal computer 3 in the reproducing unit RUi instructs the start of transferring to the reproducing unit RUi, the transfer instruction signal St is sent to the data transfer device 1 from the controller 10 of the transfer rate changing device 2. The data transferring device 1 reproduces the intermediate record medium RMi by the predetermined transfer rate (e.g. 20M BPS) for a predetermined time period. The reproduction time is set to correspond to the data volume capable of storing the data at one time in the buffer memory or memories in the transfer rate changing device 2. This reproduction time may be set in accordance with the memory capacity of just one buffer memory or a plurality of buffer memories.

The reproduced digital data is supplied to the transfer rate changing device 2 as the block data (since the reproduction is performed intermittently), and is stored into one buffer memory BMi among the buffer memories BM1 to BMn according to the writing selection signal Sw supplied by the controller 10. When the head portion of the block data is stored to the buffer memory BMi, the controller 10 supplies the reading selection signal Sr to select the buffer memory BMi, to which the block data is being stored, and supplies the reading clock Ri to the selected buffer memory BMi. Thus, from the transfer rate changing device 2, the digital data output by the transfer rate of 10M BPS.

Just before the first block data completely output from the buffer memory BMi, the controller 10 outputs the transfer selection signal St to instruct the signal transferring device 1 to transfer the next (second) block data. The second block data transferred from the signal transferring device 1 is stored into a buffer memory BMj different from the buffer memory BMi which has stored the first block data.

At the time when transferring the first block data from the buffer memory BMi is completed, the controller 10 outputs the reading selection signal Sr to select the buffer memory BMj which stores the second block data and supplies the reading clock Ri to the selected buffer memory BMj. From the output terminal of the reading switch SWr, the second block data output consecutively after the first block data. Namely, the output of the transfer rate changing device 2 consists of continuous digital data while the transfer rate thereof is changed to half of the transfer rate of the data transferring device 1.

Figure 4:
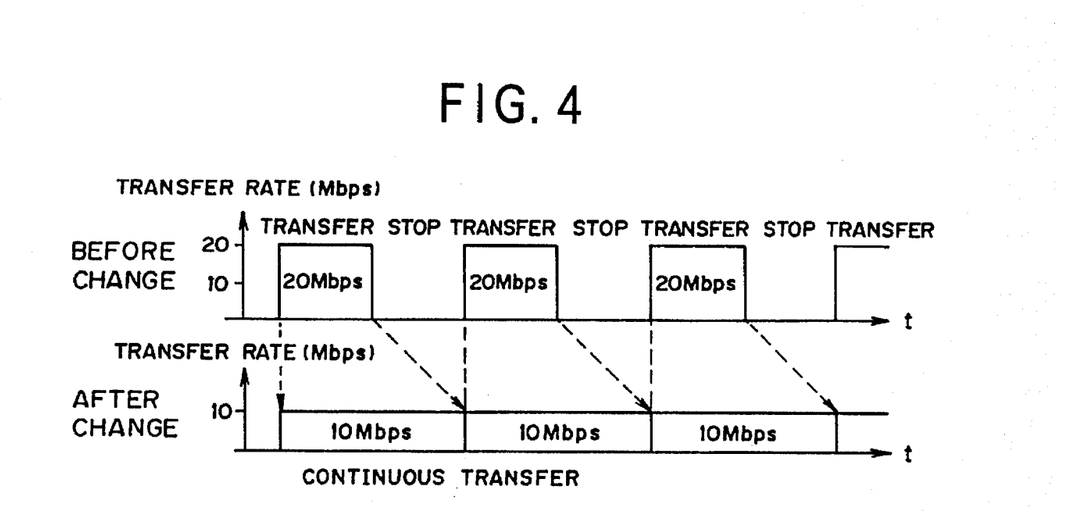
FIG. 4 is a timing chart of a transfer rate in one operation of the transfer rate changing device of FIG. 2.

FIG. 4 shows the timing chart of the transfer rate of the digital data output from the data transferring device 1 (i.e. the transfer rate before the change) and the transfer rate of the digital data output from the transfer rate changing device 2 (i.e. the transfer rate after the change) in the master disc recording apparatus 100.

When the total data volume recorded on the intermediate record medium RMi small compared is to the memory capacity of the buffer memory BMi in the transfer rate changing device 2, it is unnecessary to switch over the buffer memory BMi.

Figure 5:
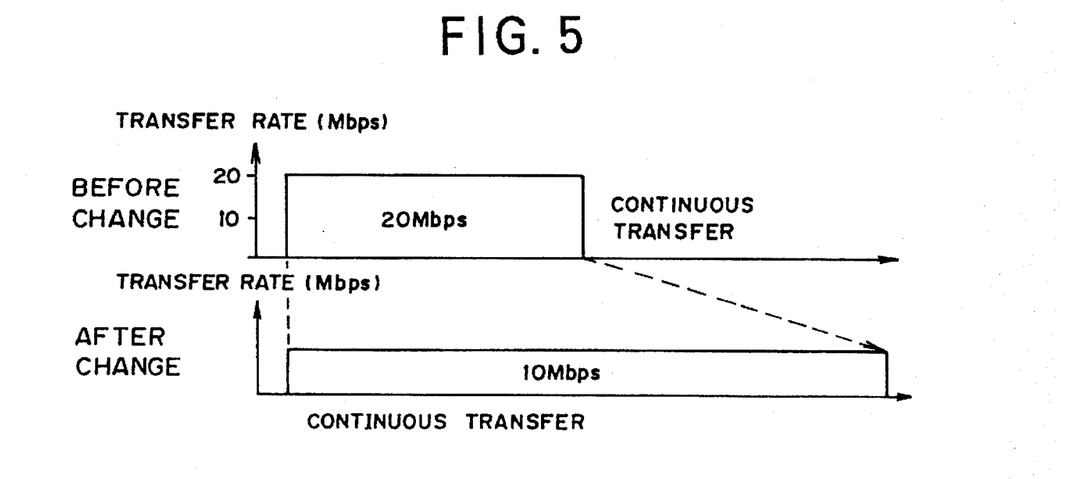
FIG. 5 is a timing chart of a transfer rate in another operation of the transfer rate changing device of FIG. 2.

Namely, in this case, as shown in FIG. 5, the data transferring device 1 continuously transfers the digital data until the end thereof. Then, the transfer rate changing device 2 records the transferred digital data into the buffer memory BMi while it simultaneously outputs the digital data stored in the buffer memory BMi by a transfer rate lower than the transfer rate at the time of transferring the digital data into the buffer memory BMi.

The recording device 5 performs cutting of the master disc 6 for DVD at the transfer rate of the digital data transferred from the transfer rate changing device 2 (i.e. 10M BPS) via the modulator 4. At this time, the recording device 5 employs a linear velocity of the master disc 6 different from that in the standard record and reproduction. The difference is based on the relationship between the transfer rate of the transferred digital data and the transfer rate in the standard record and reproduction. Here, the transfer rate (10M BPS) of the transferred digital data is twice the standard average transfer rate (5M BPS) for the DVD standard record and reproduction. More concretely, the rotation number of the master disc 6 is doubled with respect to that of the DVD standard record and reproduction. The increase in the rotation number is a rather a simple operation and does not require a complicated mechanical adjustment or a complicated adjustment in the circuit constants. Thus, the accuracy is not degraded by this adjustment in the rotation number, while the total number of steps required for the adjustment is small.

Since the transfer rate is doubled and the linear velocity is doubled in the above explained recording operation with respect to those of the standard recording operation, the master disc 6 is recorded with the information substantially equivalent to the case where the standard recording operation is performed.

As described above, according to the first embodiment, since it is possible to record the information by the transfer rate higher than the transfer rate of the standard record and reproduction of the master disc, the time for recording and forming the master disc can be reduced. Further, since the input side and the output side of the buffer memory BMi can be separately and freely switched over, the transfer rate can be changed with an easy adjustment of timing.

(II) Second Embodiment

The construction of the second embodiment is the same as that of the first embodiment shown in FIGS. 1 and 2.

In the second embodiment, as the master disc 6, a HVD, which transfer rate in the standard record and reproduction is 30M BPS is recorded. The data transferring device 1 reproduces the intermediate record medium Hi which has a physical shape and a same format as those of this HVD.

In this configuration, the data transferring device 1 outputs the block data by the transfer rate of 30M BPS on the basis of the instruction of the transfer rate changing device 2. The transfer rate changing device 2 changes the block data, which transfer rate is 30M BPS, to the continuous digital data, which transfer rate is 10M BPS, by performing the same process as the first embodiment.

The recording device 5 performs cutting of the HVD as the master disc 6 at the transfer rate of 10M BPS. This time, the transfer rate (10M BPS) is ⅓ of the transfer rate (30M BPS) of the standard record for the HVD. The linear velocity of the master disc 6 at the recording device 5 is adjusted on the basis of this ratio (⅓) of those transfer rates. Namely, the rotation number of the master disc 6 is set to be ⅓ of the rotation number required for the standard record for the HVD.

That is to say, the master disc 6 is recorded with the information equivalent to that of the standard record since the linear velocity is ⅓ while the transfer rate is ⅓.

As described above, according to the second embodiment, the information recording operation can be performed with respect to the master disc 6, which standard record frequency is relatively high, without re-adjusting the recording device 5. Thus, even in the production procedure in which the types of the optical discs are frequently changed, since the re-adjustment of the recording device 5 is not necessary, the total number of steps can be decreased. Further, since an error due to the re-adjustment of the recording device 5 is minimal, the quality of the master disc 6 can be maintained high.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A master disc recording apparatus comprising:

a data transferring device for transferring a data block of digital data, divided into a plurality of data blocks, at a first transfer rate each time a transfer instruction signal is supplied thereto;

a memory device for storing the data block at the first transfer rate, which is transferred from said data transferring device, and outputting the stored data block at a second transfer rate, which is different from the first transfer rate;

a controlling device for supplying the transfer instruction signal, which instructs said data transferring device to transfer one data block to said memory device, to said data transferring device when said memory device finishes outputting another data block which has been transferred from said data transferring device prior to said one data block; and a recording device for recording the data block outputted from said memory device onto a data track of a master disc at the second transfer rate such that a recording point where the data block is recorded on the data track is moved in a radial direction of the master disc by a moving distance per each unit time which is constant regardless of a type of master disc.

2. An apparatus according to claim 1, wherein said data transferring device intermittently reproduces a record medium, on which the digital data is recorded, to generate the plurality of data blocks.

3. An apparatus according to claim 1, wherein said recording device records the data block onto the data track such that a linear velocity of the recording point along the data track is increased relative to a linear velocity corresponding to a standard transfer rate of the master disc by an amount based on a ratio of the standard transfer rate and the second transfer rate if the standard transfer rate is lower than the second transfer rate.

4. An apparatus according to claim 1, wherein said recording device records the data block onto the data track such that a linear velocity of the recording point along the data track is reduced relative to a linear velocity corresponding to a standard transfer rate of the master disc by an amount based on a ratio of the standard transfer rate and the second transfer rate if the standard transfer rate is higher than the second transfer rate.

5. An apparatus according to claim 1, wherein:

said memory device comprises a plurality of memories each for storing the transferred data block at the first transfer rate and outputting the stored data block at the second transfer rate; and said controlling device selects one of said memories on the basis of a data volume of the data block and the first transfer rate, as a memory to store the transferred data block at the first transfer rate, and further selects another of said memories on the basis of the data volume of the data block and the second transfer rate as a memory to output the stored data block at the second transfer rate.

6. A master disc recording system for recording data on master discs of a plurality of different types, comprising:

a plurality of intermediate recording media for storing data;

a plurality of editing units for storing the data on a corresponding plurality of the intermediate recording media at a first transfer rate, each of said editing units storing data for a different type of said master discs;

a plurality of reproducing units, corresponding in number to the plurality of editing units, for reading the data from the intermediate recording media at the first transfer rate and outputting the data at a second transfer rate, which is different than the first transfer rate; and a recording device, connected to the plurality of reproducing units, for receiving the data at the second transfer rate and recording the data on one of said master discs.

7. The system according to claim 6, wherein each of the reproducing units comprises a memory device for storing the data at the first transfer rate and outputting the stored data at the second transfer rate; and a controlling device for controlling the storing and outputting of said memory device.

8. The system according to claim 7, wherein each of the reproducing units further comprises a data transferring device for receiving the data from the intermediate recording media and transferring the data to the memory device in data blocks at the first transfer rate, the data transferring device transferring one of said data blocks each time a transfer instruction signal is supplied thereto;

the controlling device supplying the transfer instruction signal to said data transferring device when said memory device finishes outputting another data block which has been transferred from said data transferring device prior to said one data block.

9. The system according to claim 8, wherein said data transferring device intermittently reproduces the data from the intermediate recording media to generate the data blocks.

10. The system according to claim 8, wherein said memory device comprises a plurality of memories each for storing the transferred data block at the first transfer rate and outputting the stored data block at the second transfer rate; and said controlling device selects one of said memories on the basis of a data volume of the data block and the first transfer rate, as a memory to store the transferred data block at the first transfer rate, and further selects another of said memories on the basis of the data volume of the data block and the second transfer rate as a memory to output the stored data block at the second transfer rate.

11. A method for recording data divided into a plurality of data blocks on master discs of a plurality of different types, comprising the steps of:

transferring one of said data blocks at a first transfer rate to a memory device;

storing the one data block at the first transfer rate in the memory device;

outputting the stored one data block from the memory device at a second transfer rate, which is different from the first transfer rate;

transferring another one of said data blocks to said memory device when said memory device finishes outputting said one data block which has been transferred to said memory device prior to said another data block; and recording the one data block outputted from said memory device onto a data track of one of the master discs at the second transfer rate such that a recording point where the one data block is recorded on the data track is moved in a radial direction of the one master disc by a moving distance per each unit time which is constant regardless of the type of the one master disc.

12. A method according to claim 11, wherein said recording step comprises the step of recording the one data block onto the data track such that a linear velocity of the recording point along the data track is increased relative to a linear velocity corresponding to a standard transfer rate of the one master disc by an amount based on a ratio of the standard transfer rate and the second transfer rate if the standard transfer rate is lower than the second transfer rate.

13. A method according to claim 11, wherein said recording step comprises the step of recording the one data block onto the data track such that a linear velocity of the recording point along the data track is reduced relative to a linear velocity corresponding to a standard transfer rate of the one master disc by an amount based on a ratio of the standard transfer rate and the second transfer rate if the standard transfer rate is higher than the second transfer rate.

14. A method according to claim 11, wherein said memory device comprises a plurality of memories;

the storing step comprises the steps of selecting one of said memories on the basis of a data volume of the one data block and the first transfer rate, and storing the one data block in the selected one of said memories at the first transfer rate; and the outputting step comprises the steps of selecting another of said memories on the basis of the data volume of the one data block and the second transfer rate, and outputting the one data block from the selected another of said memories at the second transfer rate.

* * * * *

UNITED STATES PATENT AND TRADEMARK OFFICE
CERTIFICATE OF CORRECTION

PATENT NO.:       5,631,888

DATED:            May 20, 1997

INVENTOR(S):      Naoto ITOH et al.

It is certified that an error appears in the above-identified patent and that said Letters Patent is hereby corrected as shown below:

Title page, column 1, item [73], in the assignment, insert --; Pioneer Video Corporation, both of-- after "Pioneer Electronic Corporation".

Signed and Sealed this

Third Day of March, 1998

*Attest:*

BRUCE LEHMAN

*Attesting Officer*    *Commissioner of Patents and Trademarks*